United States Patent [19]
Hutchins et al.

[11] Patent Number: 6,118,745
[45] Date of Patent: Sep. 12, 2000

[54] ACQUISITION OF HIGHLY VARIABLE DATA FREQUENCY BY DIGITAL EDGE PROCESSING

[75] Inventors: Robert Allen Hutchins; Glen Alan Jaquette, both of Tucson, Ariz.; Kazuhiro Tsuruta, Sagamihara, Japan

[73] Assignee: International Business Machines Corporation, Armonk, N.Y.

[21] Appl. No.: 09/013,058

[22] Filed: Jan. 26, 1998

[51] Int. Cl.⁷ ........................................................ G11B 7/00
[52] U.S. Cl. .................... 369/59; 369/47; 369/48; 369/124
[58] Field of Search .................. 369/59, 47, 50, 369/124, 48; 360/51, 42, 43, 45, 65

[56] References Cited

U.S. PATENT DOCUMENTS

| | | | |
|---|---|---|---|
| 4,357,707 | 11/1982 | Delury | 360/119 |
| 5,077,531 | 12/1991 | Takeuchi et al. | 375/83 |
| 5,408,200 | 4/1995 | Buhler | 331/1 A |
| 5,416,809 | 5/1995 | Masuda et al. | 375/376 |
| 5,502,711 | 3/1996 | Clark et al. | 369/124 |
| 5,598,396 | 1/1997 | Horibe et al. | 369/59 |

*Primary Examiner*—Thang V. Tran
*Attorney, Agent, or Firm*—Robert M. Sullivan; John H. Holcombe

[57] ABSTRACT

Disclosed is a digital edge processor frequency control for estimating the center frequency of a recorded signal having a known format, such as data recorded on a CLV optical disk or on magnetic tape. The read channel includes a sampling detector which samples the recorded signal at a known rate to provide edge position signals (PAT) indicating the location of recorded pulse edges. An edge pattern identifier detects whether the edge signals of the recording signal match a predetermined element of the known format. Examples of predetermined elements include a pulse of a known length and whose edges are spaced a known distance, a predetermined pulse pattern, or a pulse or pattern at a known location. An interval counter is coupled to the pattern identifier for measuring the interval length between the edges of the matching pulse or pattern in units of the sample length. A center frequency estimator calculates the period of the center frequency of the matching edges by relating the matching edge interval length to a predetermined nominal wave length for the predetermined element of the known format. The result is a Tau that is used to establish the center frequency for the digital PLL.

33 Claims, 12 Drawing Sheets

ACQUISITION OF HIGHLY VARIABLE DATA FREQUENCY BY DIGITAL EDGE PROCESSING

TECHNICAL FIELD

This invention relates to data recovery channels for data storage systems, and, more particularly, to data recovery channels for data whose frequency is highly variable.

BACKGROUND OF THE INVENTION

Many data storage systems, such as optical disk or tape, move the data storage media at variable speeds. In optical disk systems, such as CD-ROM or DVD-ROM, the disk is rotated so as to maintain a constant linear velocity (CLV) across the full recording surface, which comprises a single spiral track from the inner diameter to the outer diameter. Data at the inner tracks is written and read at the same linear velocity (in the track direction) as the outer tracks. However, since the location of the tracks are different distances from the hub, the rotation speed of the drive must be adjusted for the given distance of the reading head from the hub. This arrangement maximizes the data storage capacity of the disk as compared to a constant angular velocity, such as magnetic disk drives which store the same amount of data on each track at the same data rate regardless of the distance from the hub. The CLV arrangement is ideal for data having a continuous format, such as a motion picture.

Modified versions of constant linear velocity systems, and mixed constant linear velocity, constant angular velocity systems also exist. One example is DVD-RAM, which, in one option, is constant angular velocity within a zone, and the zones are stepped in frequency, and, in another option, is constant linear velocity within a zone with a discontinuity at a zone boundary to allow for spares.

However, random access between CLV tracks a considerable radial distance from each other, or across modified CLV and CLV/CAV zone boundaries, requires that data recovery channel must delay until the motor speed is sped up or slowed down and adjusted to provide the correct linear velocity. Random access is important, for example, in interactive games or for non-sequential data processing. The wait for motor speed adjustment may degrade the effective data rate of the device very substantially.

Tape drives also run at a constant linear velocity, typically, for the full length of the tape. Data storage tape drives capable of random access, however, are required to stop and start at specific records. Thus, the data recovery channel must also wait until the motor speed is adjusted to provide the correct linear velocity, which degrades the effective data rate of the tape drive.

Optical and tape data storage systems employ high linear density recording (closely spaced data) to give both high capacity and a high instantaneous data rate. Such systems, however, require a very precise data clocking system which operates at a sampling rate which is some multiple of the center data frequency. An example is a phase locked loop (PLL) which locks the sampling rate to the frequency of the data. The most precise phase locked loop is a digital PLL. The PLL is provided with the Tau, which relates the sample rate to the period of the nominal center frequency of the data. In order to track the data precisely and follow small variations in the data rates, the digital PLL will vary the clocking sample rate slightly, but does not vary substantially from the supplied Tau.

Thus, the precise nature of the PLL, and the ability to adapt rapidly to a highly variable data frequency are at odds.

SUMMARY OF THE INVENTION

An object of the present invention is to provide adjustment to a digital PLL such that it may acquire the center frequency of a data stream whose frequency is highly variable.

Another object of the present invention is to employ digital edge processing in a data recovery channel to rapidly acquire the center frequency of a data stream whose frequency is highly variable.

Still another object is to provide a constant linear velocity optical disk drive with frequency acquisition for the data read channel allowing random access to data whose linear velocity varies from the nominal.

Disclosed is a digital edge processor frequency control for estimating the center frequency of a recorded signal having a known format, such as data recorded on a CLV optical disk or on magnetic tape. The read channel includes a sampling detector which samples the recorded signal at a known rate to provide edge signals indicating detection of the location of recorded signal pulse edges relative to the samples. An edge pattern identifier is coupled to the sampling detector for detecting a relationship between the edge signals of the recording signal matching a predetermined element of the known format. Examples of predetermined elements include a pulse of a known length and whose edges are spaced a known distance, a predetermined pulse pattern, or a pulse or pattern at a known location. An interval counter is coupled to the pattern identifier for measuring the interval length between the edges of the matching pulse or pattern in units of the sample length between the matching edges. A center frequency estimator is coupled to the interval counter for calculating the period of the center frequency of the matching edges by relating the matching edge interval length to a predetermined nominal wave length based on samples for the predetermined element of the known format. The result is a Tau that is used to establish the center frequency for the digital PLL.

A subsequent error check may be conducted by checking the measured interval length to determine whether the estimated center frequency is erroneous.

For a fuller understanding of the present invention, reference should be made to the following detailed description taken in conjunction with the accompanying drawings.

DETAILED DESCRIPTION OF THE INVENTION

Figure 1:
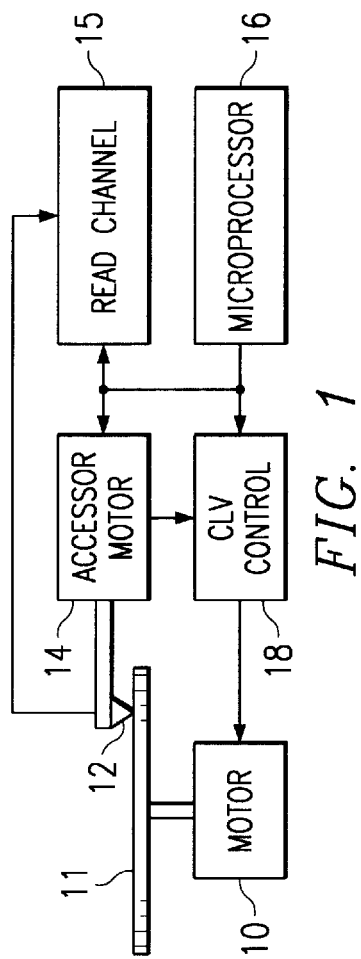
FIG. 1 is a diagrammatic representation of a constant linear velocity optical disk drive and read channel employing the digital edge processor frequency control of the present invention.
Figure 2:
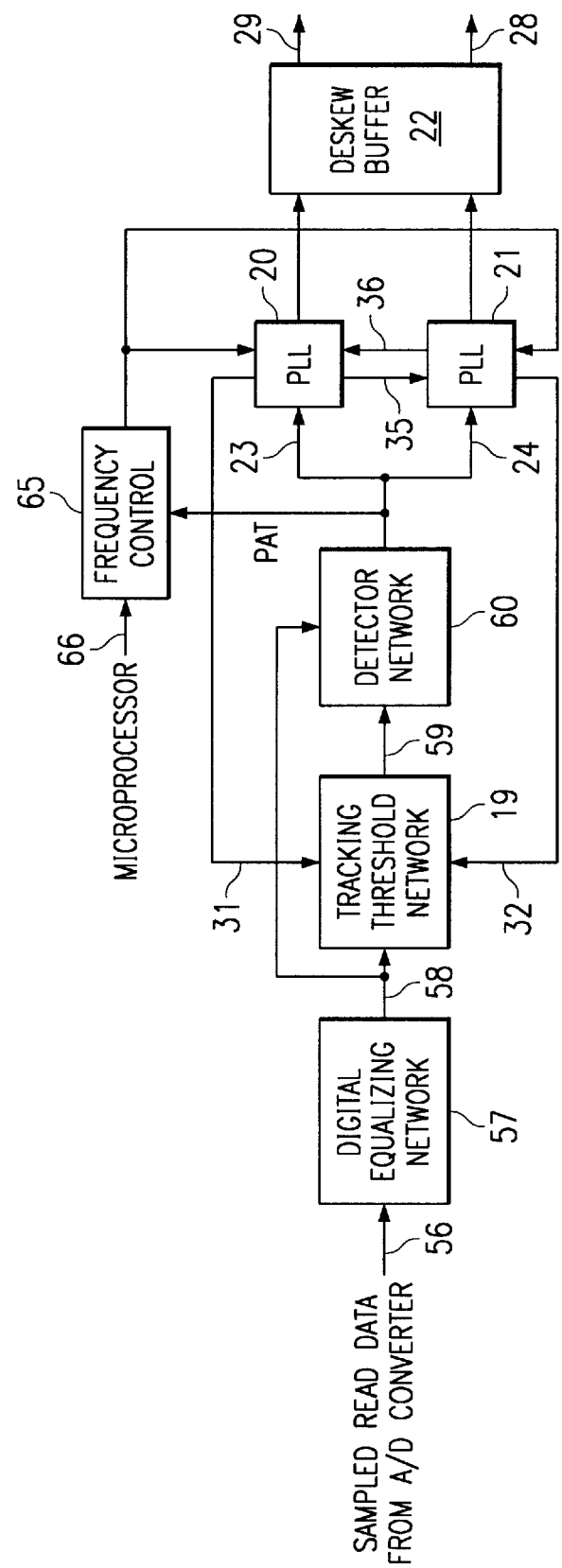
FIG. 2 is a block diagram of the read channel and frequency control of FIG. 1.

Referring to FIGS. 1 and 2, a conventional constant linear velocity (CLV) optical disk drive is illustrated, which additionally incorporates a digital phase locked loop (PLL) as described in coassigned U.S. Pat. No. 5,502,711, Clark et al., issued Mar. 26, 1996, and which additionally incorporates the digital edge processor frequency control for estimating the center frequency of a recorded signal of the present invention.

Referring to FIG. 1, the conventional CLV, modified CLV, or mixed CLV/CAV optical disk drive, comprises a variable speed motor 10 which rotates an optical disk 11. The optical disk, such as a CD-ROM, a DVD-ROM, or DVD-RAM disk, typically has a single spiral track from the inner diameter to the outer diameter. An optical read head 12 typically includes a laser and a servo system for following the spiral track and reading the information recorded on the track. CD-ROM and DVD-ROM typically has the information recorded on a continuous basis. DVD-RAM typically has the information separated into sectors which include burst patterns and synchronization characters ("sync marks") in the address area ("address mark") between sectors. The separate zones for DVD-RAM, as described above, typically include a number of sectors in each DVD-RAM zone.

An accessor motor 14 moves the optical read head 12 radially across the surface of the disk 11 to access the spiral track at specified addresses. This capability is called random access and is important, for example, in interactive games or for non-sequential data processing.

The information from the optical read head is provided to a read channel 15 for detection and transmission to the using device.

The addressing of the desired information is directed by a microprocessor 16, which also operates the read channel 15.

A constant linear velocity controller 18 responds to the radial position of the optical head 12 to adjust the rotation speed of the motor 10 to rotate the disk so as to maintain a constant linear velocity (CLV) across the full recording surface. Specifically, since the location of the tracks are different distances from the hub, the rotation speed of the drive must be adjusted for the given distance of the reading head from the hub. Thus, data at the inner tracks is written and read at the same linear velocity (in the track direction) as the outer tracks. This arrangement maximizes the data storage capacity of the disk as compared to a constant angular velocity, such as magnetic disk drives which store the same amount of data on each track at the same data rate regardless of the distance from the hub.

Read channel 15 is shown in greater detail in FIG. 2. A bus 56 provides a sampled digital read data signal that is provided from the read head 12 by an analog to digital converter (not shown). The digital signal is provided to the input of a digital equalizer 57. The digital output 58 of equalizer 57 is provided as an input to a tracking threshold 19, and to a detector 60.

Tracking threshold 19 provides an estimate of a centerline magnitude value of the digital signal which lies midway between the maximum and the minimum magnitudes of the digital equalized output 58. The centerline value is used in feedback to tend to center the signal amplitude, and is provided as an input to detector 60.

Threshold output 59 and the equalized sample output 58 are used by detector 60 in determining the bit cell positions where the negative and the positive transitions of the input data occur. Essentially, the tracking threshold value is subtracted from the instantaneous value of the sample, and the detector 60 estimates the location of the transition ("Pulse Arrival Time", PAT) amongst the samples, using extrapolation when necessary. The timing to determine the location of the transition is under the control of the digital PLLs 20 and 21.

The digital phase locked loops lock onto the frequency of the data, using either or both the positive and the negative transitions, and provide sample clocking signals at the data frequency to sample the input signal from the read head 12. In order to provide precise phase adjustments, there is an additional extrapolation quantization to 1/64 of a sample. Each of the PLLs 20 and 21 provides a phase error signal 31 and 32 as two additional inputs to the tracking threshold 19. The phase error signals 31 and 32 are employed to lock the tracking threshold signal 59 to the correct level, as well as to provide the sample clocking.

Referring additionally to FIG. 1, the digital PLLs 20 and 21 are adapted to provide an adjustment of the centerline frequency while being locked to the data. This adjustment is very precise and cannot adjust when the optical head 12 is moved by accessing motor 14 to a radially spaced position on the disk 10. Thus, typically, reading must wait until the CLV control 18 indicates that the motor has completed its change of speed so that the disk is rotating at the correct angular velocity to move the track at the correct constant linear velocity.

In accordance with one embodiment of the present invention, frequency control 65 is provided to make measurements on known features of the recorded format detected from the PAT digital signal from detector 60, and from these features, determine the frequency of the data written on the optical disk. An input 66 from the microprocessor 16 may indicate the characteristics of the format of the optical disk to be employed in making the measurements.

The period (called "Tau") of the estimated frequency of the data, in terms of the sampling rate, is supplied by frequency control 65 to the digital PLLs 20 and 21 to provide the data clocking. Thus, the data can be detected and read by the read channel immediately without waiting for the motor 14 to complete its change to the correct angular velocity to provide the constant linear velocity of the track of disk 10.

Figure 3:
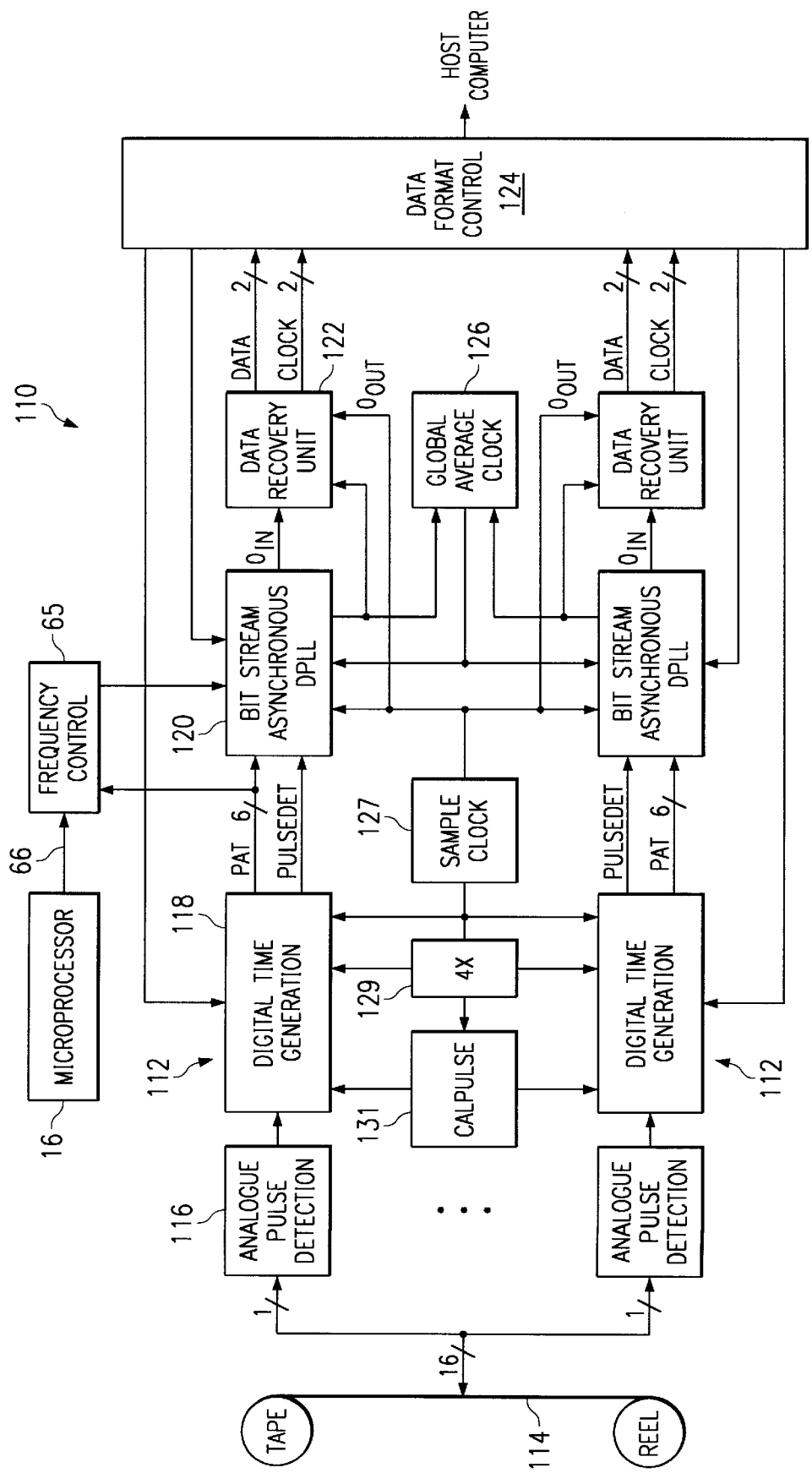
FIG. 3 is a diagrammatic representation of a tape drive and read channel employing the digital edge processor frequency control of the present invention.

FIG. 3 illustrates a data read channel 110 for a conventional start-stop tape drive 114. The read channel additionally incorporates a digital phase locked loop (PLL) as described in coassigned U.S. Pat. No. 5,442,315, Hutchins, issued Aug. 15, 1995, and which additionally incorporates the digital edge processor frequency control for estimating the center frequency of a recorded signal of the present invention.

Start-stop tape drives are typically multi-track devices, and the data read channel 110 therefore comprises a plurality of parallel data recovery channels 112. Each channel 112 is dedicated to one of a plurality of the tracks on the magnetic tape. Conventional analog pulse detection circuitry 116 includes a tape head, buffering and amplification circuitry, and an analog equalizer and peak detector, and the raw data signal is applied to a digital time generation circuit 118. As with respect to the optical system, above, the digital time generation circuitry 118 utilizes a fixed clock or sample period for generating a pulse acquisition timing signal (PAT). The PAT generation is the same as that described above with respect to the optical disk data channel and comprises the timing (in terms of samples) of the edge or transition between magnetic states. The PAT signal is applied to a digital phase locked loop (PLL) 120. The PLL 120 produces a phase estimate signal which is applied to a data recovery unit 122 and an accumulated output phase signal which is applied to data recovery unit 122 and a global average frequency generator 126. The data recovery unit 122 generates a data stream and a clock signal which are applied to a data format control 124 for recovery of the parallel data. The global average frequency generator 126 returns an average frequency estimate to each PLL based on the average frequency of all the PLL's.

The tape drive 114 may conduct a seek to a record and stop while waiting for the next command, or stop when identifying an error condition. When it stops, the stop is at the end of one data record and it then will back up and start again, enabling at a subsequent data record, or reverse direction. Thus, typically, reading must wait until the tape drive is up to its constant linear speed so that the data will be received at the desired frequency, matching the PLL 120, and will be detected by the data recovery unit 122. Typically, the tape drive is provided with a high torque motor so as to reach the desired speed quickly, and the tape requires long gaps between records to accommodate the startup of the motor.

In accordance with one embodiment of the present invention, frequency control 65 is provided to make measurements on known features of the recorded-format detected from the PAT digital signal from detector 112, and from these features, determine the frequency of the data written on the magnetic tape. An input 66 from the microprocessor 16 may indicate the characteristics of the format of the magnetic tape to be employed in making the measurements.

The period (called "Tau")of the estimated frequency of the data, in terms of the sampling rate, is supplied by frequency control 65 to the digital PLLs 120 to provide the data clocking. Thus, the data can be detected and read by the read channel immediately without waiting for the tape drive 114 to complete its acceleration from the stop condition to provide the constant linear velocity of the magnetic tape.

Figure 4:
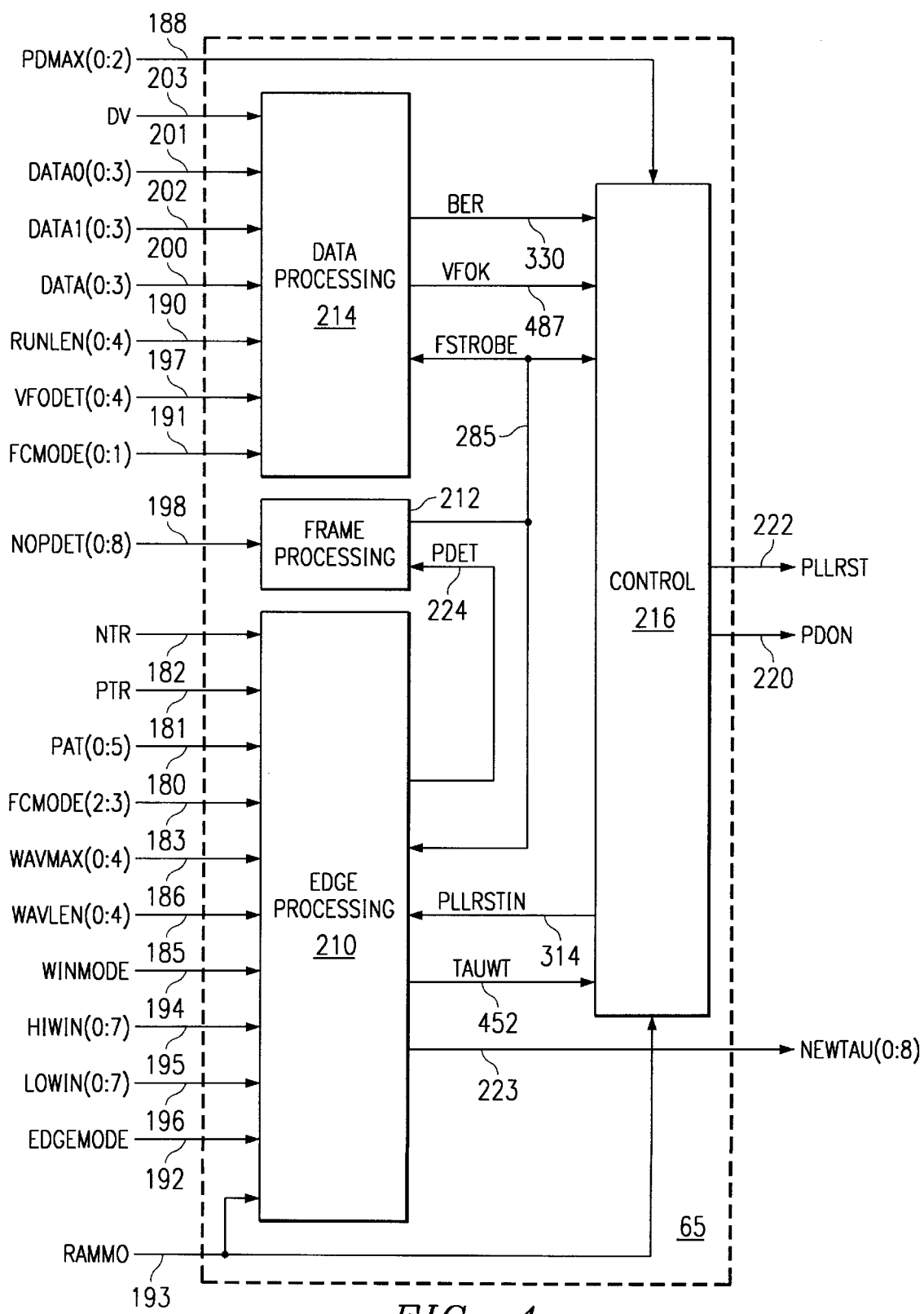
FIG. 4 is a block diagram of the frequency control system of the present invention employed in the read channels of FIGS. 2 or 3.

One embodiment of a frequency controller 65 of FIG. 2 or of FIG. 3 is illustrated in FIG. 4. The frequency controller 65 is coupled at input 180 to the associated sampling detector PAT output for detecting a relationship between the edge signals of the recording signal matching a predetermined element of the known format. The embodiment of the frequency controller of FIG. 4 is capable of employing predetermined elements of several types to including a pulse of a known length and whose edges are spaced a known distance, a predetermined pulse pattern, or a pulse or pattern at a known location. Alternative embodiments may be specifically directed to one type of optical disk drive with one predetermined element, or to only a tape drive with one predetermined element.

The frequency controller 65 is also provided with inputs 181 and 182 which, respectively, indicate whether the PAT is a positive or negative transition edge of the data stream. This input may be utilized to base the detection of the predetermined element on only unidirectional edges or on both the positive and negative edges.

The microprocessor 16 provides several input signals to the frequency controller 65 on input bus 66. Input signal "FCMODE"183 indicates whether both the positive and negative edges are to be employed in the frequency measurement, or whether only the positive or only the negative edges are to be used from inputs 181 and 182. Another of the input signals "WAVLEN" 185 indicates the nominal number of samples in the predetermined element pattern, comprising the nominal wavelength of the pattern. The frequency control divides the nominal wave length by the measured matching edge interval length in order to provide the period of the center frequency. "WAVMAX" 186 is the maximum wavelength, which if exceeded in counting the matching edge interval from the first edge, indicates that the second or ending edge must have been missed, and aborts the count. "PDMAX" 188 is related to the measurement of the matching edge interval and indicates the number of tries that are allowed without finding the matching edges before aborting the search. "RUNLEN" 190 is set by code and is the number of zeros in the interval between the edges in the detected data for the predetermined element. It is used to indicate whether the PLL is in or out of frequency lock for the predetermined element.

A number of signals are related to the specific mode of the frequency control directed by the microprocessor 16. "FCMODE" 191 selects data from PLL 0 or PLL 1 or both, and "FCMODE" 183 selects the PTR or NTR from the detector to detect by having only one bit which is used to gate the one of the data streams that is being detected, e.g., PLL 0, or PLL 1, or both. "EDGEMODE" 192 indicates that only one polarity edge of the predetermined element is to be measured, e.g., rising edge to rising edge. For example, in CD-ROM, the character having the longest interval between edges in the 2,10 code is the 11T data character. In CD-ROM, the predetermined element comprises two consecutive 11T data characters. If only positive or negative edges are used, then only the leading or only the trailing edges of each of the two consecutive 11T data characters will be measured. This mode of operation is "EDGEMODE". Alternatively, either or both of the two 11T characters may be measured using both polarities which measure both the leading and trailing edges. As another example, DVD-ROM employs a special synch character which is longer than any data character, and 14T in length. Edge mode cannot be used for a single character. The advantage of edge mode is that it measures the longest wavelength, independent of the polarity of the waveform. It does not matter if the 11T/11T pattern is written as a mark then space or a space then mark. This measurement eliminates any measurement error introduced by the tracking threshold and allows a longer wavelength to be measured, reducing the effects of quantization (the samples are quantized to 1/64 of a sample).

As still another example, in burst mode, set by "RAMMO" 193, the burst may comprise a series of special characters, such as VFO characters. Bursts may be employed as the predetermined element, for example, in DVD-RAM, so that "RAMMO" means RAM mode. When a burst is to be measured, the microprocessor sends the "WINMODE" signal 194 and sets the thresholds identifying the length of the interval in which the burst is to be examined. The high threshold is "HIWIN" 195 and the low threshold is "LOWIN" 196. "VFODET" 197 indicates the number of VFO characters required to detect the complete pattern of VFO characters, including the predetermined element.

"NOPDET" 198 indicates the predetermined number of edges signals (pulses) to be counted for establishing a processing interval, or frame, for the digital edge processor. The frame comprises a reasonable number of the recorded signals to insure that the predetermined element will have been encountered. Thus, if the predetermined element is not encountered in the interval, it was missed, and the frequency control will start over with a new frame.

The data detected by the read channel is supplied at the DATA 200, DATA0 201, DATA1 202 inputs, and, when the data is a complete at the input, DV 203 is activated, indicating that the data is valid. DATA 200 comprises the data output from both PLL 0 and PLL 1, DATA0 201 comprises the data output from PLL 0 (negative edges), and DATA1 202 comprises the data output from PLL 1 (positive edges).

Figure 6:
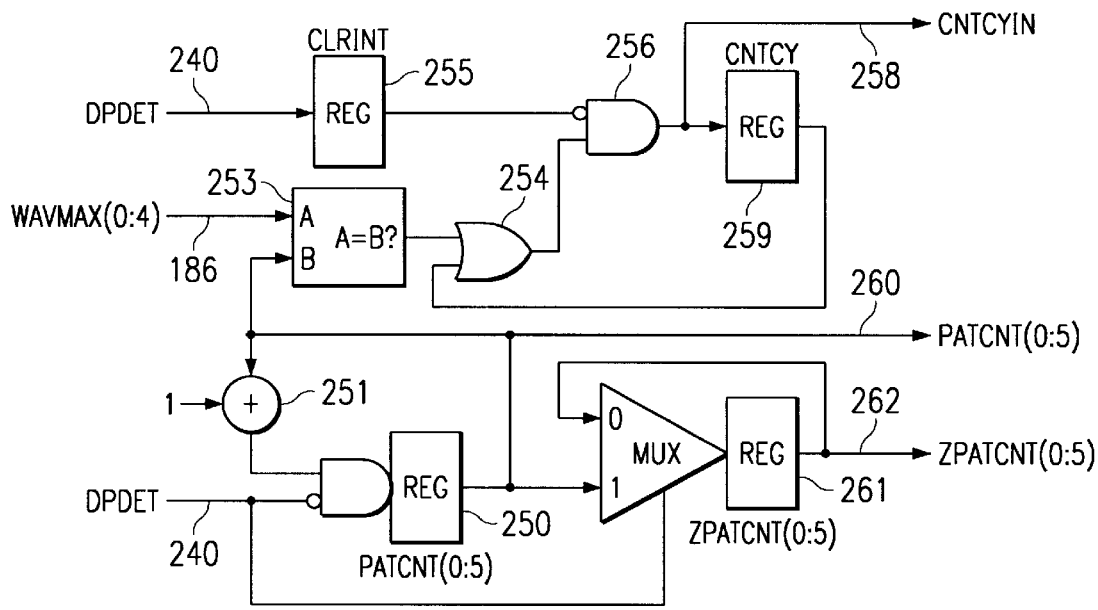
Figure 7:
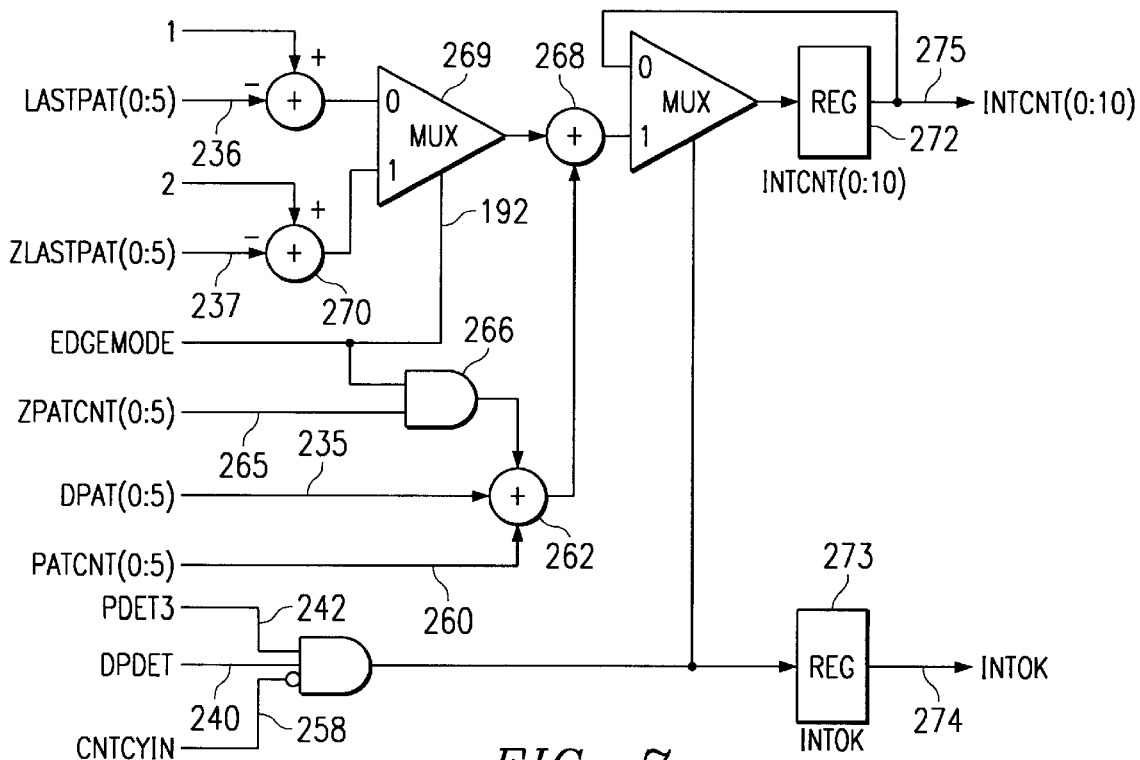
Figure 8:
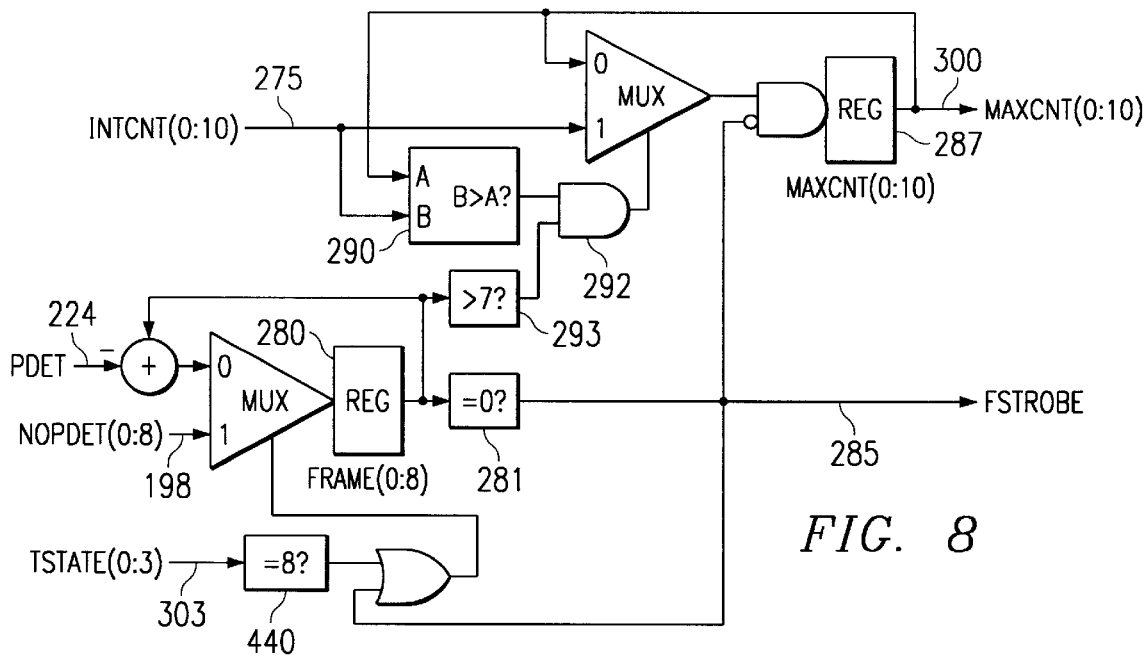
Figure 15:
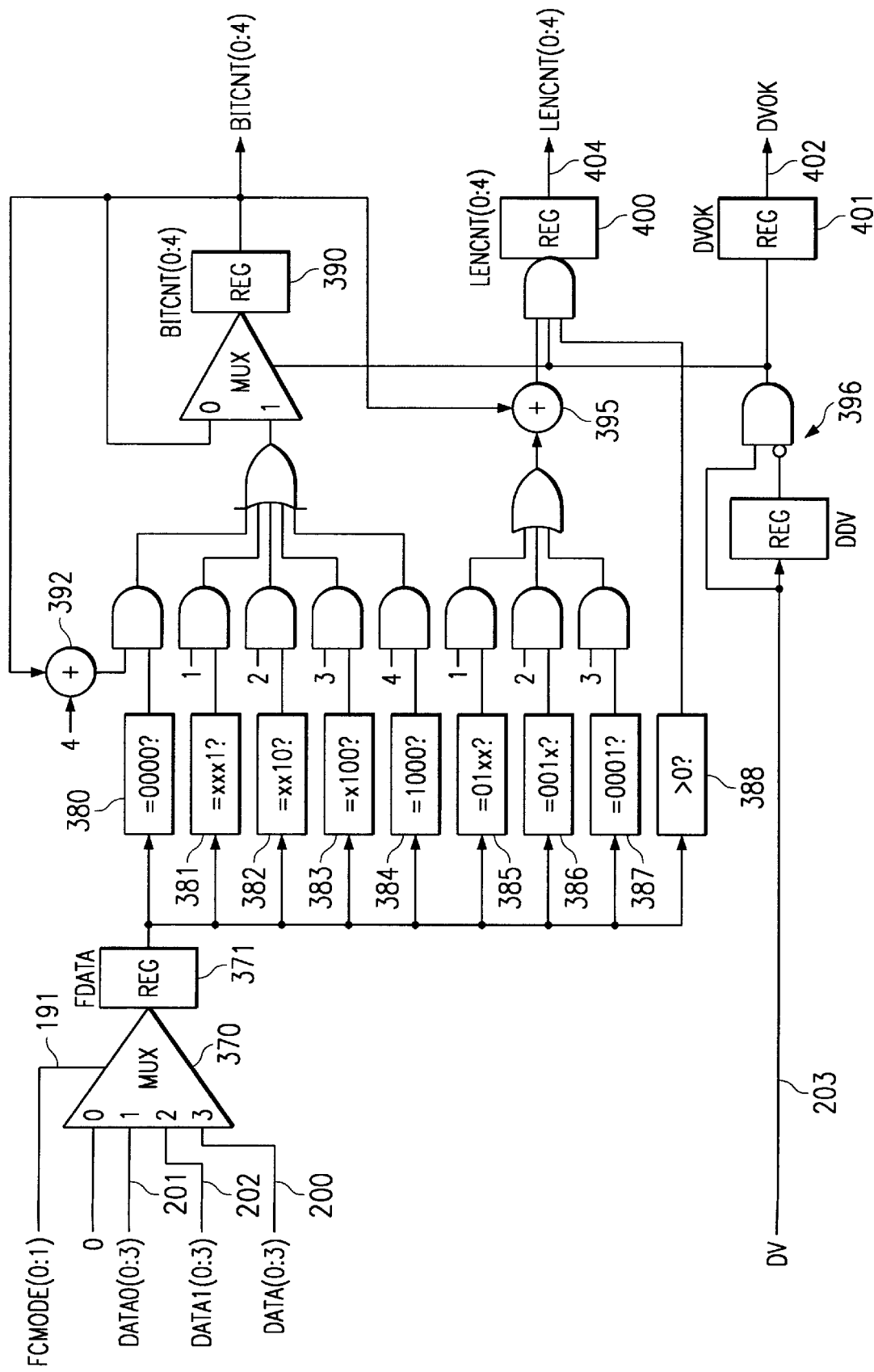
FIGS. 15 and 16 are block diagrams of an embodiment of the data processing block of FIG. 4 of the present invention for to determining whether the center frequency of the digital PLL remains correct or is erroneous.
Figure 16:
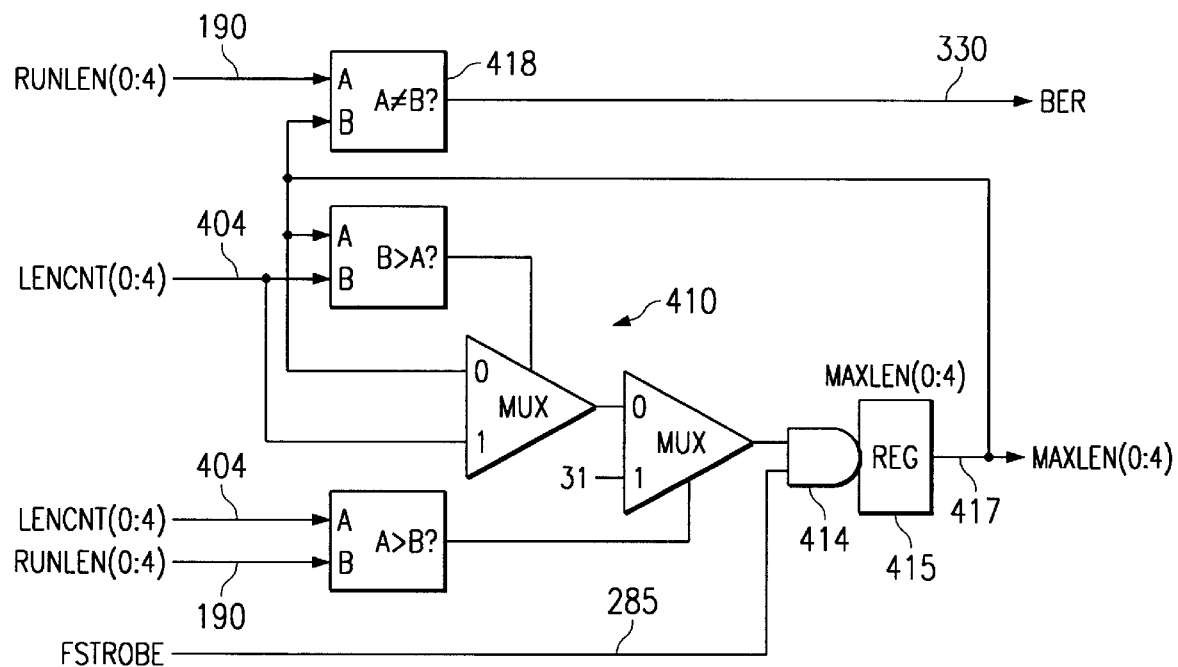
Figure 18:
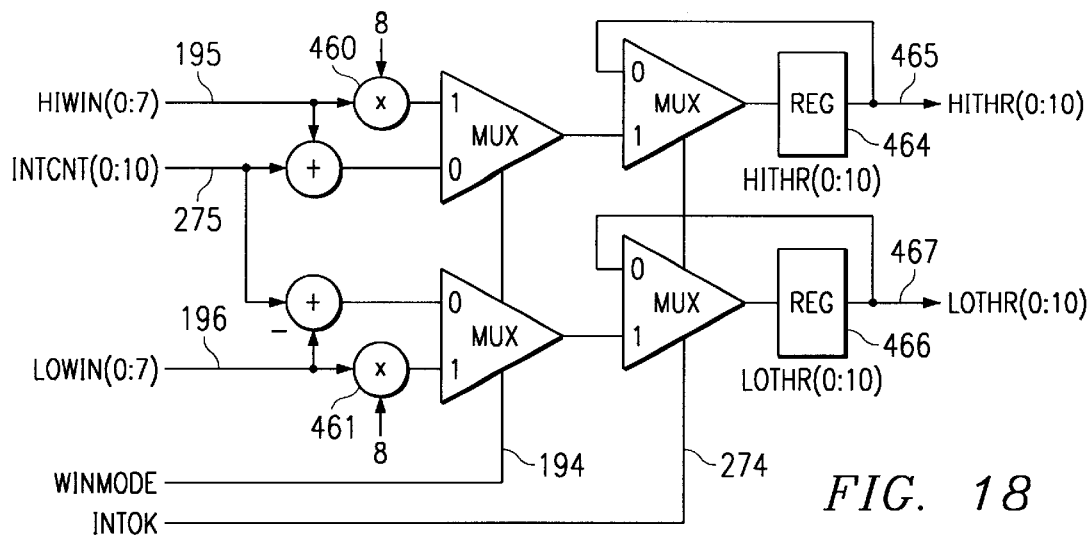
FIGS. 18–20 are block diagrams of an alternative embodiment of the present invention operated by the state machine of FIG. 9.
Figure 19:
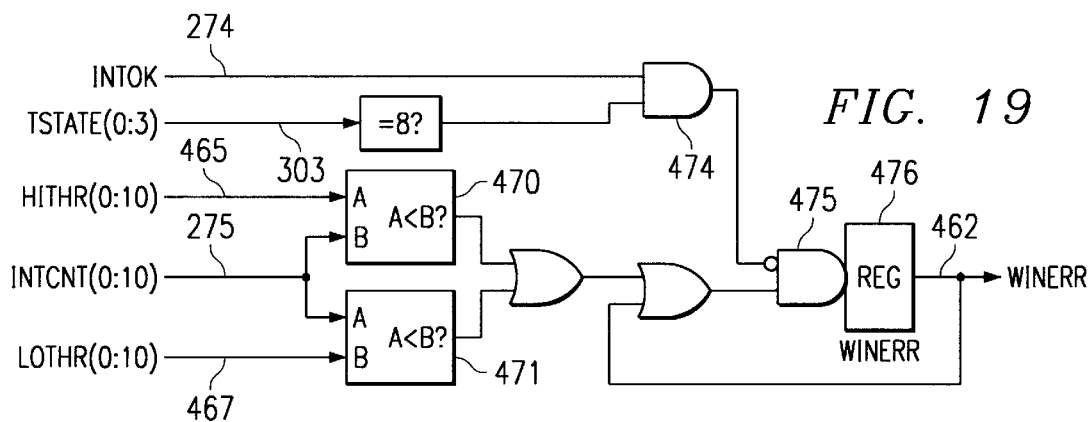
Figure 20:
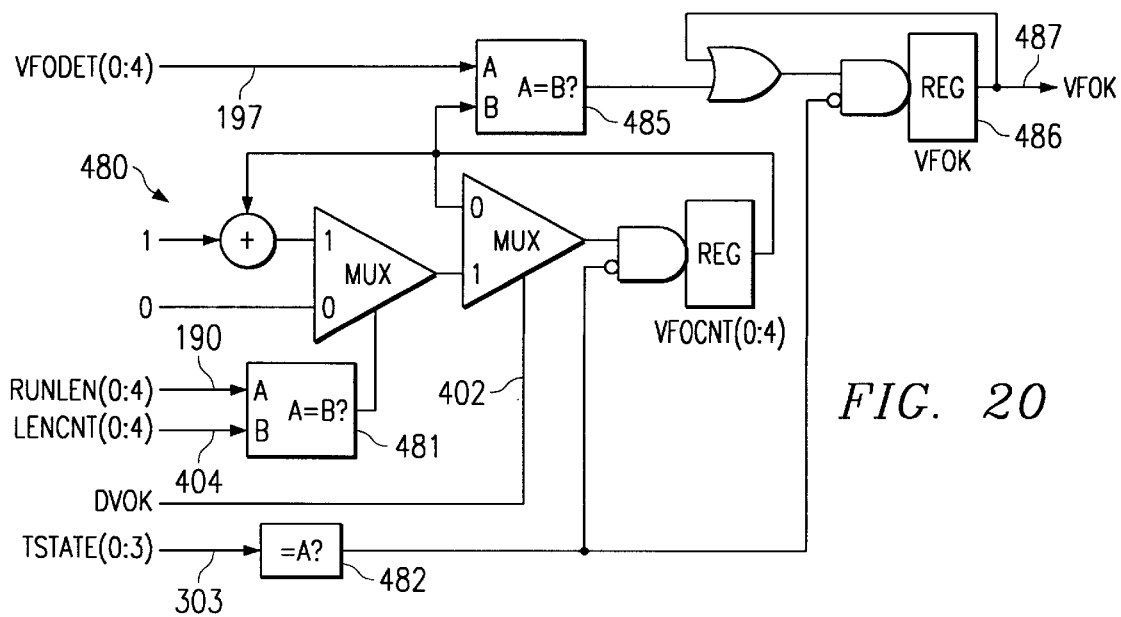

The major groups of logic for the frequency control 65 illustrated in FIG. 4 are Edge Processing block 210, illustrated in FIGS. 5–7, 12, 18 and 19, Frame Processing block 212, illustrated in FIG. 8, Data Processing block 214, illustrated in FIGS. 15, 16, and 20, and Control block 216, illustrated in FIGS. 9–11 and 17.

Briefly, Edge Processing block 210 responds to the pulse arrival times (PAT) 180 to measure the distance between the edges for the desired predetermined element. The measurements are made in terms of sample clocks, which, e.g., in PWM mode comprises quantization to 1/64 of a complete sample period. Frame Processing block 212 is employed when measuring predetermined elements not having a known location, such as spans between edges for CD-ROM and DVD-ROM, and sets up the processing intervals in which it can be expected that the predetermined element will appear. Data Processing block 214 is employed to monitor the PLL output to determine if the PLL is correctly locked to the data. Control 216 controls the sequencing of the logic for the frequency control 65.

Outputs from the frequency control 65 are "PDON" 220 indicating to the microprocessor that the measurement process has been completed, "PLLRST" 222 which indicates to the PLL that the measurement has been completed and the newly calculated period of the frequency is available at "NEWTAU" 223, and "PLLRST" resets the PLL to the new period, or Tau.

Again, the purpose of the frequency control 65 is to make measurements on predetermined elements of the known format recorded data, and these measurements are employed to determine the frequency of the data on the media with respect to the read head. Once the frequency is determined, the PLL center frequency is set by supplying the period of the data in sample times, Tau, to the PLL, and the PLL will lock to the data, even if the velocity of the data is significantly different than the nominal operating point. The predetermined elements are continually monitored by the frequency control 65 to determine if the PLL is correctly locked. If the frequency control 65 determines that the PLL is not correctly locked, it will re-measure the frequency of the data and set the PLL center frequency to the new value.

Rather than describe each of the blocks of FIG. 4 in detail with respect to how they operate with all types of media and drives, the operation with respect to measuring the longest span between edges of an encoded data pattern, such as for CD-ROM, will be described first. Then, differences for other approaches will be described.

A code utilized in optical disk for pulse width modulation is a (2,10) modulation code. This code indicates that transitions appear no closer than 3 bits apart (separated by 2 "0"s and no further than 11 bits apart (separated by 10 "0"s), each bit comprising a bit time period "T". In CD-ROM, every frame contains two 11T patterns, the longest pattern of the (2,10) code, written side-by-side. The bit pattern is ( . . . 01000000000001000000000010 . . . ). In accordance with an embodiment of the present invention, either a single 11T pattern or the 11T/11T pattern is used for measuring the span between opposite polarity edges. In accordance with another embodiment of the present invention, both 11T patterns are used for measuring the span between the same polarity edges, such as between positive transition edges, or between negative transition edges. The pattern comprises two edges of one polarity at each end of the pattern, and one edge of the opposite polarity at the middle of the pattern.

Inputs "FCMODE" 183 and "EDGEMODE" 192 from microprocessor 16 provide the information to select the mode of the frequency control 65, and "WAVLEN" 185 indicates the nominal number of samples in the predetermined element pattern, comprising the nominal wavelength of the pattern. The purpose of the Edge Processing block 210 is to measure the distance between the 11T edges in sample clocks with a resolution of 1/64 of a sample.

Figure 5:
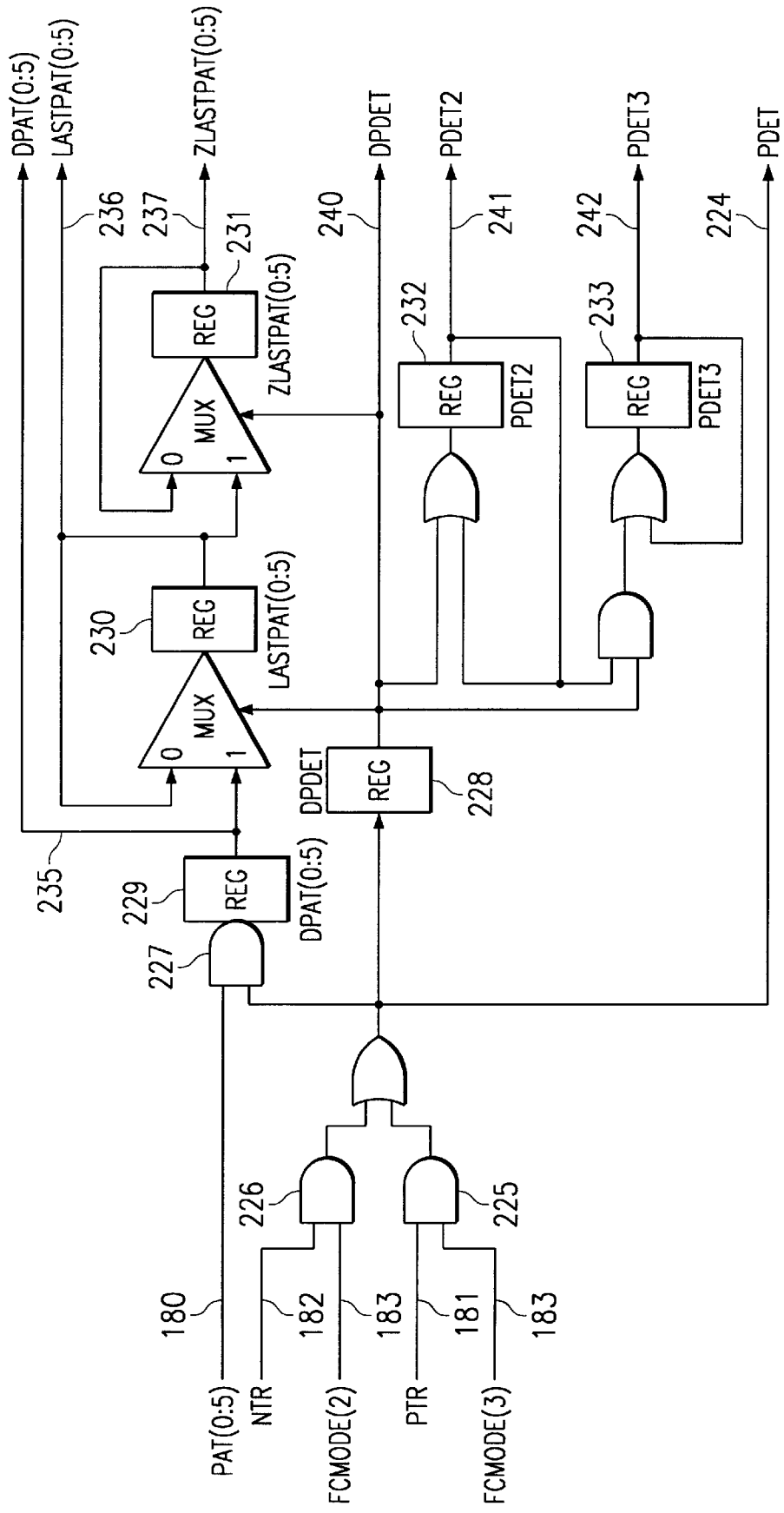
FIGS. 5–8 are block diagrams of an embodiment of the digital edge processor frequency control of the present invention.

The Edge Processing block is illustrated in greater detail in FIGS. 5–7. The Edge Processing block calculates the interval between the edges for all of the detected edges. In FIG. 5, the positive and negative transition signals from the edge detector (e.g., detector 60 in FIG. 2) are received on lines 181 and 182, and FCMODE inputs 183 operate the gates 225 and/or 226 to transmit one or either of the signals to gate 227, output "PDET" 224, and to register 228. The transmitted signal indicates that an edge, or pulse, has been detected. The timing of the detected pulse is provided (also from the edge detector) at PAT input 180 and gated by gate 227 into delayed PAT register 229. A series of delayed PAT signals and corresponding PDET signals are provided by registers 230, 231 and 232, 233, respectively. The resultant delayed PAT and PDET signals are provided at outputs 235, 236, 237 and 240, 241, 242, respectively. Thus, the circuitry of FIG. 5 provides the PAT signals for three consecutive pulses and provides the corresponding detection signal for four consecutive pulses. Since the frequency control will be counting the samples for a long span, the PDET signal is key in indicating that a PAT was detected. The only precision measurement, requiring the PAT signal, is at the beginning and end of the span.

In FIG. 6, the PAT count is conducted, which indicates the number of samples between detected PAT signals. The count is maintained in register 250 by being reset to zero by DPDET 240 and updated each sample time by adding a "1"

at circuit 251. The microprocessor provides an error checking "WAVMAX" signal at input 186 which is the maximum wavelength in terms of samples, which if exceeded in counting the matching edge interval from the first edge, indicates that the second or ending edge must have been missed, and aborts the count. Thus, if the PAT count matches WAVMAX, circuit 253 provides a signal via OR 254, and the absence of the DPDET 240 signal, held in register 255, gates the signal at gate 256 to "CNTCYIN" output 258 to indicate that the interval being timed is aborted. Register 259 holds the abort signal for one cycle. When the next edge detection signal is received at line 240, and it is within the expected time, the PAT count is supplied on "PATENT" output 260 and is latched by register 261 and supplied at "ZPATCNT" output 262.

In FIG. 7, the length measurement is made of the total span between the edges. The PAT count at input 260 is added to the timing of the ending edge, received at DPAT input 235 by circuit 265. If only single polarity edges are utilized, the previous PAT count must be added to the total. The indication whether only the positive or negative edges are being utilized is provided at "EDGEMODE" input 192 from the microprocessor. That input operates gate 266 to add the previous count. The total is provided to adding circuit 268. If in EDGEMODE ("1"), to multiplexor 269 supplies the delayed last PAT timing 237, as subtracted from 2 sample times at circuit 270, to be added to the total. The calculation of subtracting the edge timing from 2 takes into account that the PAT count does not include the count of the sample time including the middle, opposite polarity edge.

If not in EDGEMODE ("0"), indicating that opposite polarity pulses are being measured as the predetermined element, the LASTPAT timing is subtracted from one and supplied by the multiplexor to be added to the total by adder 268. Thus, the total at adder 268 is the exact timing of the total span or interval between the edges of the predetermined element.

So long as there is no abort signal at input 258, the occurrence of the delayed edge detection signal at input 240 provides the interval count to register 272, where it is latched. The PDET3 signal on line 242 indicates that 3 pulses have been received successfully and is a check on input 240. Register 273 provides a signal at "INTOK" output 274 that the interval count at "INTCNT" output 275 is correct.

The INTOK output gates the interval count for comparison to the nominal number of sample times to calculate the period of the frequency of the data, as will be explained.

The Frame Processing block of FIG. 4 is illustrated in FIG. 8. In order to break the processing interval into reasonable distances of data, Frame Processing block 212 sets up the processing intervals in which it can be expected that the edges of the predetermined element will appear. The Frame Processing block also compares the interval measurements for the sets of edges detected by the Edge Processing block to select the longest block.

FIG. 8 illustrates the Frame Processing block in greater detail. The number of edges that comprises the frame is supplied at NOPDET input 198 from the microprocessor, and entered into register 280 by an "FSTROBE" signal. The initial FSTROBE signal is generated when the microprocessor resets the frequency control which resets register 280 to "0", providing a "0" output detected by circuit 281. The NOPDET number entered in register 280 is then decremented for each edge detect signal received at input 224. When the number is decremented to "0", the frame has been counted, and circuit 281 provides another frame signal, or "FSTROBE" on output 285.

Each of the interval counts are supplied at input 275 and gated to register 287 and latched, until an FSTROBE is received. Circuit 290 detects where the interval count stored in register 287 is exceeded by the present interval count at input 275. If the interval count exceeds the stored count, and if more than 7 edges are left in the frame, as provided by circuit 293, register 287 is updated with the new count. This process continues until circuit 293 indicates that only 7 edges are left. The result as stored in register 287 is the count of the maximum length interval encountered in the frame, and is therefore likely to be the expected 11T predetermined element of the instant example, and is provided on output 300.

The Control block 216 of FIG. 4 controls the sequencing of the logic for the frequency control 65.

Figure 9:
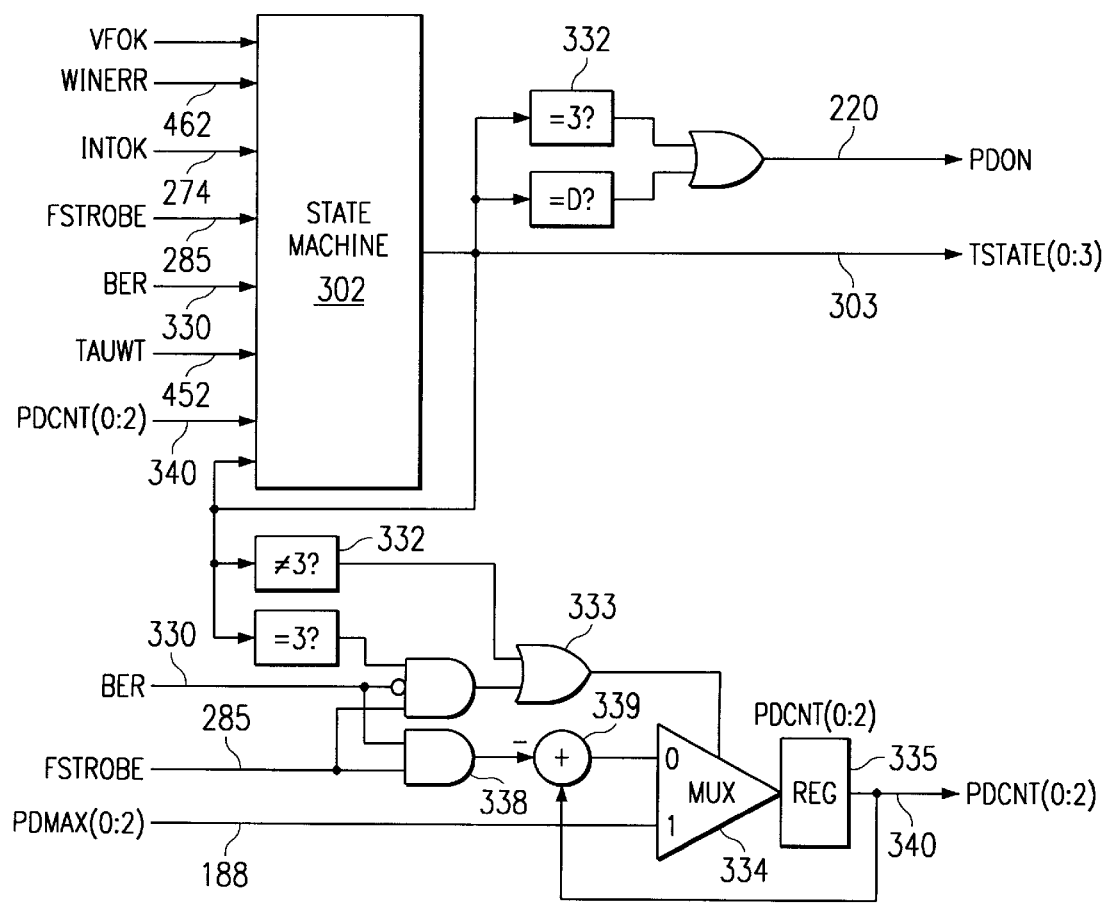
FIG. 9 is a block diagram of the state machine operating the digital edge processor frequency control of the present invention.
Figure 10:
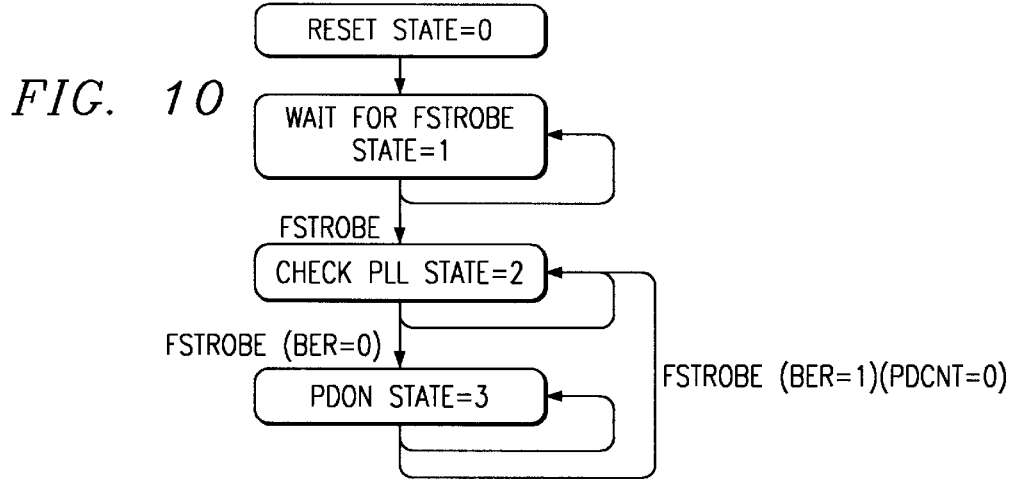
FIG. 10 is a flow chart illustrating the operation of the state machine of FIG. 9.
Figure 11:
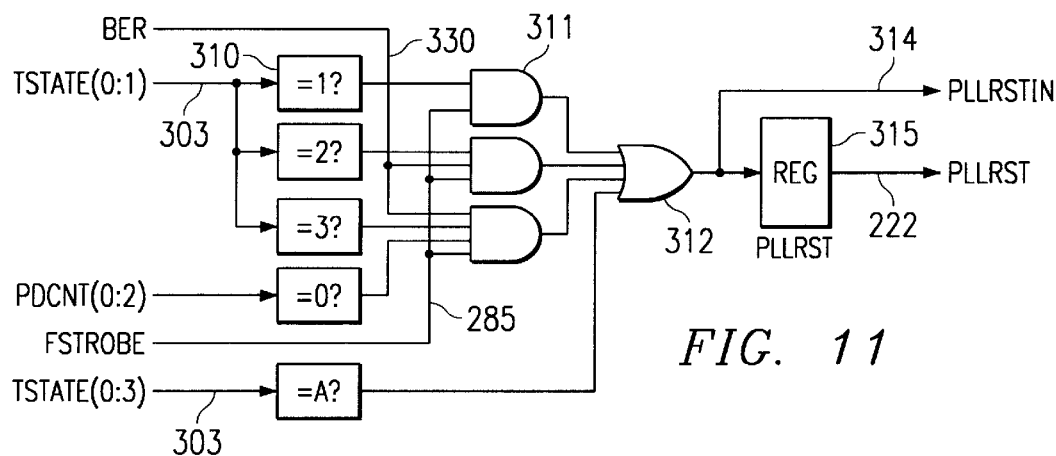
FIGS. 11 and 12 are block diagrams of the logic of the frequency control system of the present invention for calculating the estimated period of the center frequency and providing it to the digital PLL of the read channel.

The Control block is illustrated in greater detail in FIGS. 9–11. The state diagram of FIG. 10 illustrates the states of the state machine 302 depicted in FIG. 9. The state of the state machine is provided at output 303. The state machine is reset by the microprocessor when the optical head or the tape is accessed to a new address. The state machine is thus reset to state "0". The state machine immediately moves to state "1" which waits for the FSTROBE signal. Referring additionally to FIG. 11, circuit 310 detects the TSTATE input 303 indicating state "1" and enables gate 311. When the FSTROBE signal is received, it is gated by gate 311 and transmitted by OR 312 to output 314 to indicate that the PLL is to be reset and is provided to register 315 to provide the PLL reset "PLLRST" signal at output 222 of the frequency control to the PLL.

Figure 12:
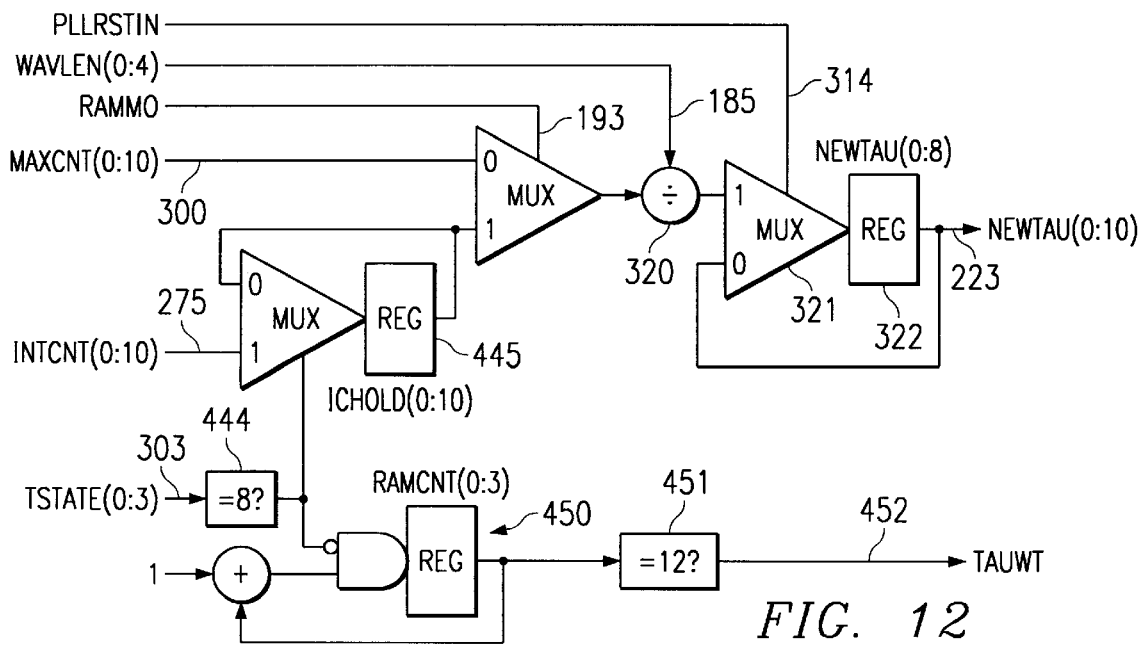

The calculation of the period of the estimated center frequency of the data is made by the circuitry of FIG. 12. The count of the maximum length interval from the circuitry of FIG. 8 is supplied at the MAXCNT input 300 and gated (RAMMO="0") to a divider 320. The other input to the divider is "WAVLEN" 185 which indicates the nominal number of samples in the predetermined element pattern, comprising the nominal wavelength of the pattern. The divider 320 divides the nominal wave length by the measured matching edge interval length in order to provide the period of the center frequency. The result is transmitted by the PLL reset in signal PLLRST on input 314 by the multiplexor 320 to register 322 and latched. The new Tau output of register 322 is provided at "NEWTAU" output 223 to the PLL, which is reset to the new Tau output by the PLL reset signal PLLRST on output 222 of FIG. 11.

As an example, if there is a 30 percent difference in frequency between the sample rate of the read channel and the bit rate of the data, the longest pattern measured should be the 11T/11T pattern at 28.6 samples. The Edge Processing block therefore calculates the center frequency for the digital PLL as 22/28.6=0.769.

Also upon receipt of the FSTROBE, the state machine moves to state "2" to check the PLL. When the new Tau is supplied to the PLL and the PLL locks to the data, the frequency control will indicate lock by changing "BER" 330 to "0", as will be explained. With the PLL locked, the state machine moves to state "3" and circuit 332 indicates that the update to Tau is done by transmitting a signal at output 220.

As described previously, the "PDON" signal at output 220 indicates to the microprocessor that the measurement process has been completed.

As an error detection, a maximum number of frames is allowed without detection of a set of matching edges.

"PDMAX" 168 is provided by the microprocessor and indicates the number of tries that are allowed without finding the matching edges before aborting the search. If the state machine is not "3", as detected by circuit 332, OR 333 operates multiplexor 334 to transmit PDMAX to register 335. The FSTROBE inputs 285 are gated by circuit 338 if the PLL is in error as indicated by input 330 and decrement the PDMAX count by one at circuit 339 by one for each FSTROBE. The resultant count is provided at output 340 to the state machine 302. As shown in FIG. 10, upon the resultant PDCNT decrementing to "0" while the PLL error is on ("1"), the state machine cycles back to state "2" to again check the PLL.

Figure 13:
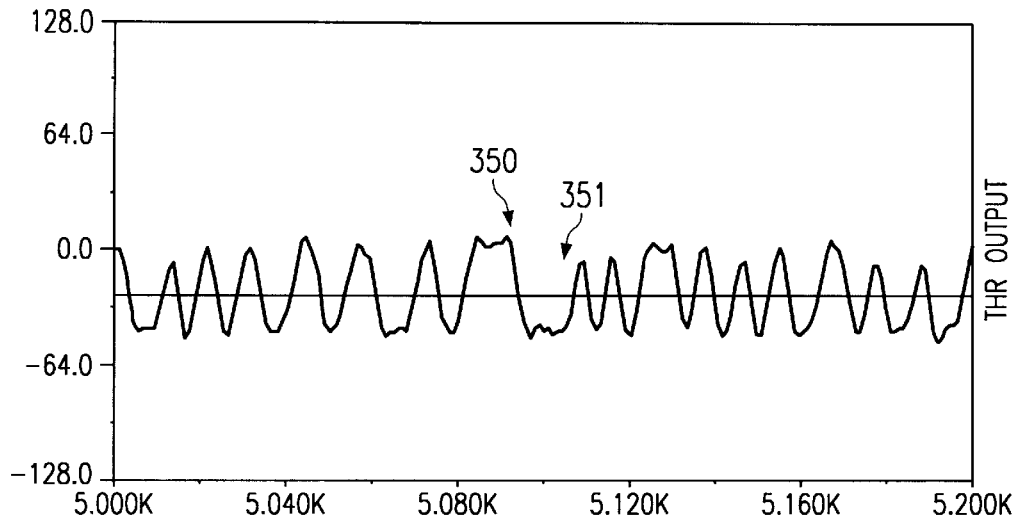
FIGS. 13 and 14 illustrate waveforms of an example of the operation of an embodiment of the digital edge processor frequency control of the present invention.

FIG. 13 illustrates a data waveform having an exemplary 11T/11T predetermined element pattern. The pattern is typical of that seen on CD-ROMs, and is shown as the longest waveform 350 beginning with a positive transition followed by the second waveform 351 of equal length beginning with a negative transition.

Figure 14:
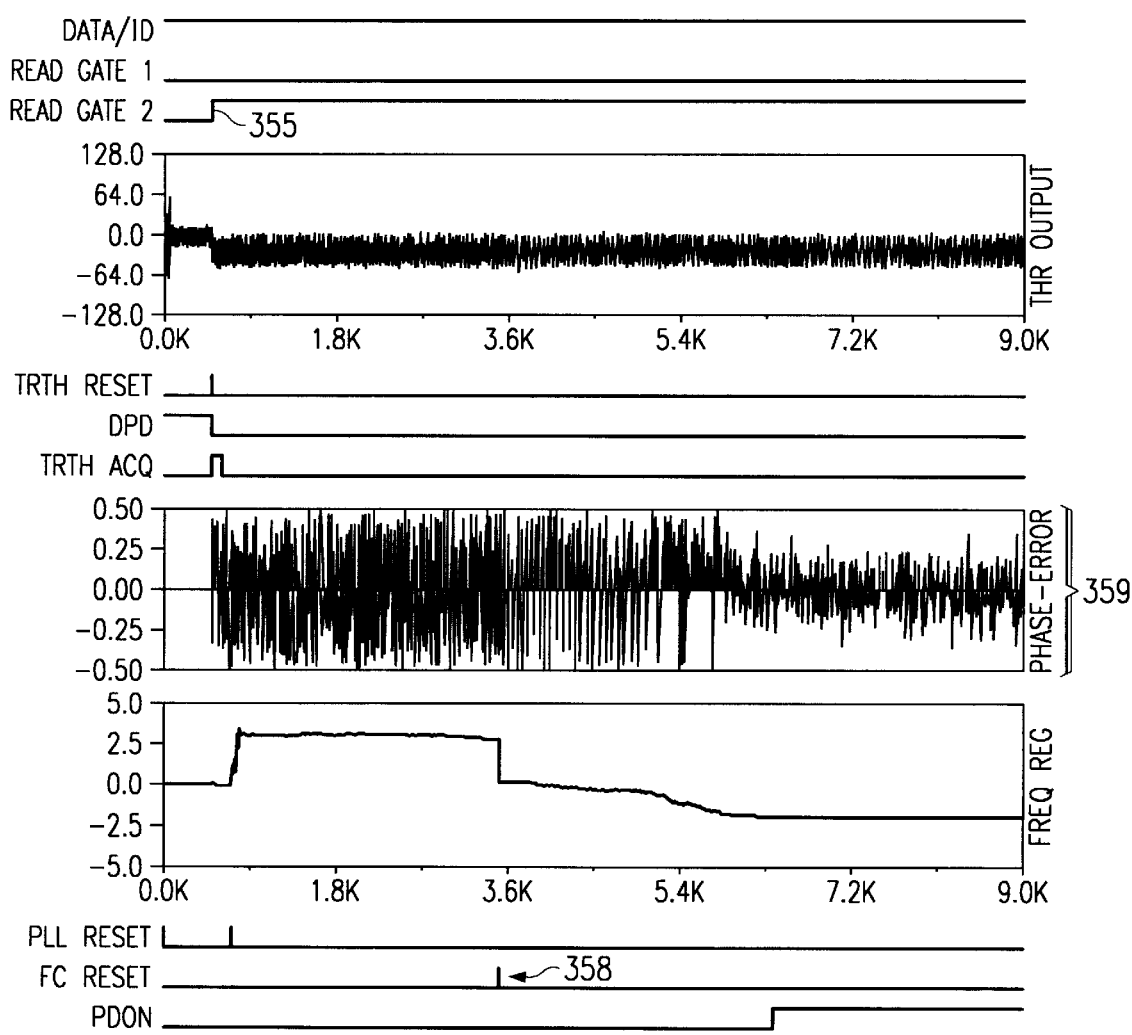

FIG. 14 shows the operation of the frequency control logic on an exemplary waveform at the tracking threshold and PLL (e.g., from tracking threshold 19 and PLL's 21 and 22 in FIG. 2) upon an access to a new address. Processing begins with the transition on Read Gate 2 355 of the edge detector (e.g., from detector 60 in FIG. 2) from low to high. When Read Gate 2 is activated, the PLL is reset to a nominal frequency, and the frequency control begins processing. When the number of edges processed matches the number set by microcode, FSTROBE is generated, so that the maximum length count is provided for the Tau calculation. At this time, the frequency control provides a PLL reset 358, and the center frequency of the PLL is set to that calculated by the frequency control. Over the interval from 3.6K to 6.3K, the PLL locks to the data. The phase error pattern 359 indicates that the PLL locks to the data at approximately 6.0K The frequency co control logic monitors the PLL output, and at 6.3K, another FSTROBE is generated and the longest wavelength measured is checked to see if it equals 11T. If the longest wavelength equals 11T, PDON becomes active and the logic assumes that the digital PLL is locked to the correct frequency.

In one embodiment of the invention, the frequency control uses the Data Processing block 214 in FIG. 2 to monitor the PLL output to determine if the PLL is correctly locked to the data. The Data Processing logic operates in a similar manner to the Edge Processor, except that it processes the bit output of the PLL rather than the edges.

Referring to FIGS. 15 and 16, FCMODE input 191 is used to gate the one of the data streams that is being detected, e.g., PLL 0, PLL 1, or both, at multiplexor 370 to register 371. Circuits 380–388 detect various bit patterns of the data in sets of 4 bits. For example, circuits 381–384 identify the beginning of a bit pattern and gate a count of the number of bits in the encountered pattern to register 390. Circuit 380 identifies strings of zeros in the pattern and gates an added count of 4 from adder 392 to the count from register 390. The count will be incremented by 4 until an end of the pattern is detected by circuit 388 and a valid data signal is received from the data detector at input 203. The number of bits in the ending pattern is gated by the appropriate circuit 385–387, and summed at circuit 395 with the bit count from register 390. Circuit 396 makes the data valid pulse exactly one bit in length so as to gate the sum from circuit 395 (circuit 388 indicates that the string of zeros has ended) to register 400. The data value indicator is provided to register 401 and supplied on "DVOK" output 402. The length count is supplied on "LENCNT" output 404 to the inputs in FIG. 16.

In FIG. 16, logic circuitry 410 looks at each bit to bit interval and gates the longest length to gate 414. When an FSTROBE is received at input 285, circuit 410 provides the longest length to register 415 by gate 414. The maximum length is provided on "MAXLEN" output 417 and is compared by circuit 418 to the number provided at input 190 by the microprocessor. If the number is not the same, circuit 418 provides a signal on "BER" output 330, indicating that the PLL has lost lock, as described above.

The present invention, when employed for DVD-ROM, may work similarly to CD-ROM. The primary difference is that the longest pattern is 14T. There is a single 14T interval, not part of the data, and the adjacent data patterns cannot be predicted. Therefore, the frequency control 65 cannot be used in edge mode for DVD-ROM. Rather, both polarities are required to identify the beginning and ending edges of the 14T interval.

Referring to FIGS. 17 to 21, an embodiment of the frequency control of the present invention is described for use with predetermined elements which are burst patterns. Additionally, the predetermined elements may be identified by location along the track or tracks, such as for DVD-RAM optical disk or for magnetic tape.

Figure 21:
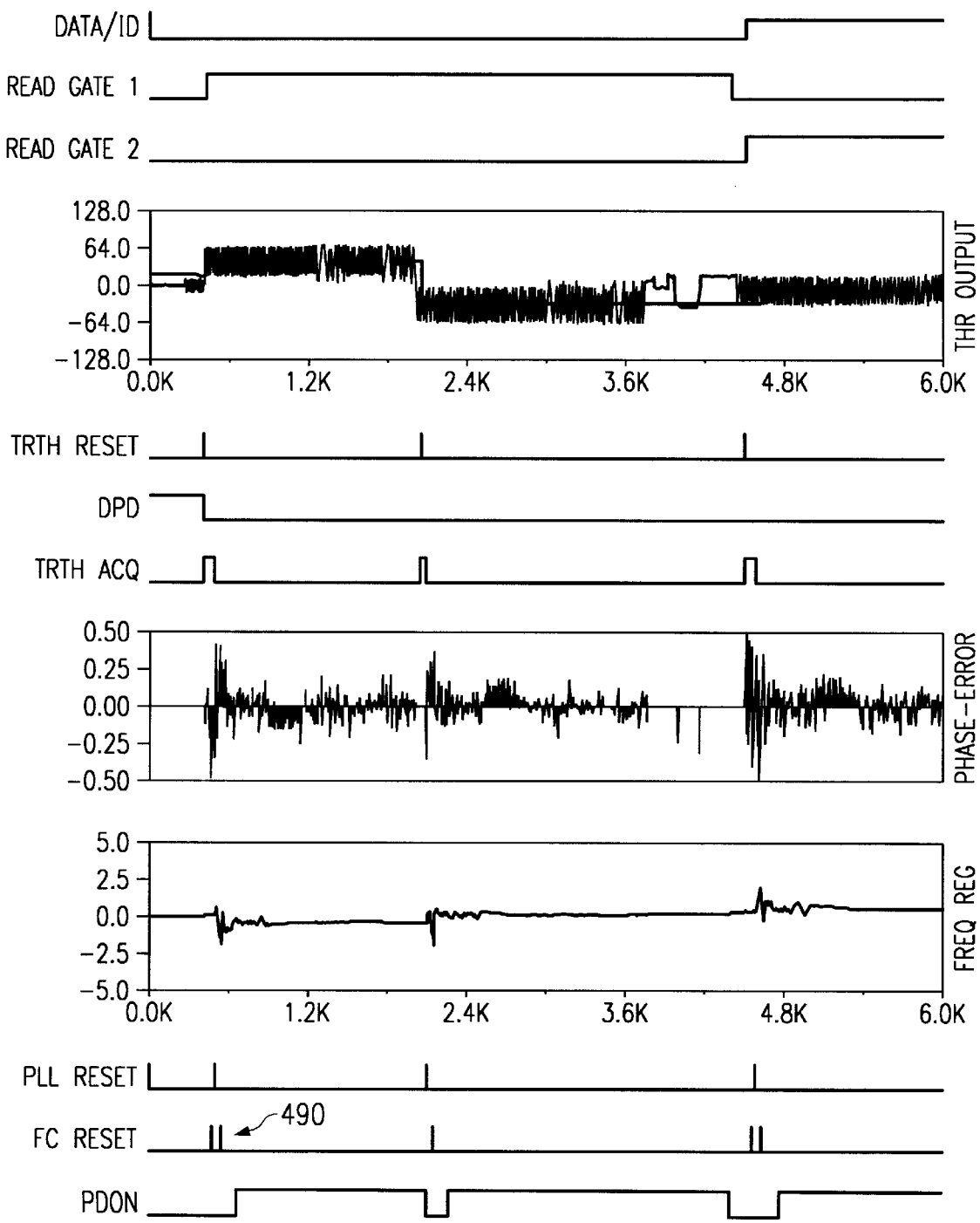
FIG. 21 illustrates waveforms of an example of the operation of the alternative embodiment of the digital edge processor frequency control of the present invention of FIGS. 17–20.

The same building blocks are used as with respect to CD-ROM or DVD-ROM, but the methodology is different. For DVD-RAM, the predetermined element may be a burst of 4T patterns, called "VFO characters", that occurs before either the ID fields or before the data fields. Referring to FIG. 21, when a transition occurs on either read gate 1 or read gate 2 after an access to a new address, the state machine is reset, "0" in FIG. 17, and the frequency control begins processing.

The microprocessor will have set the RAM mode status at "RAMMO" input 193. The microprocessor sends the "WIN-MODE" signal 194 and sets the thresholds identifying the sample location and the length of the interval in which the burst is to be examined. The high threshold is "HIWIN" 195 and the low threshold is "LOWIN" 196. "VFODET" 197 indicates the number of VFO characters comprising the complete pattern of VFO characters including the predetermined element.

Figure 17:
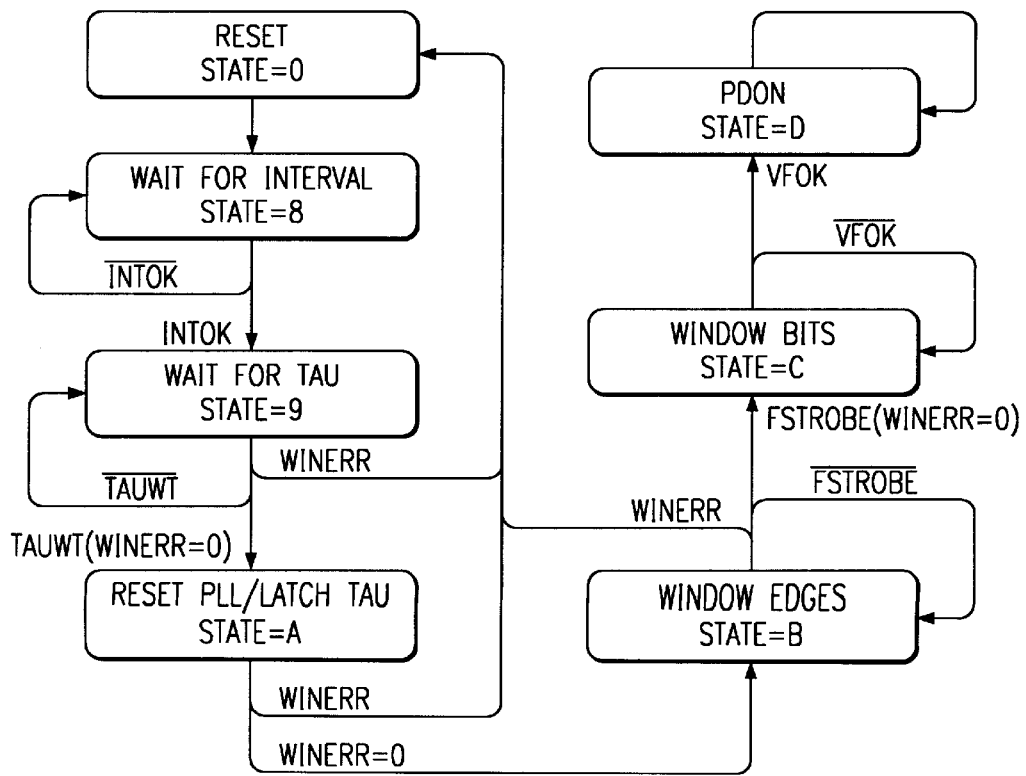
FIG. 17 is a flow chart illustrating the operation of the state machine of FIG. 9 for an alternative embodiment of the present invention.

In FIG. 17, the state machine is reset and moves to state "8" and waits for the Edge Processing to make a measurement over four 4T patterns, a 16T length and provide the "INTOK" signal. The Frame Processor of FIG. 8 loads the count of the number of edges to be detected as the result of the state machine TSTATE "8" input 303 detected by circuit 440 without an FSTROBE output.

The Edge Processor provides the INTOK signal at output 274 in FIG. 7 and provides the interval calculation at output 275 to the input of the Tau calculator of FIG. 12. Circuit 444 identifies the state ="8" from the state machine at input 303 and latches the interval count into register 445. The calculation of Tau, dividing the nominal interval count provided at WAVELEN input 185 from the microprocessor by the measured interval count for the predetermined element. The state machine receives the INTOK signal and moves to state "9". The change in state initiates operation of incrementing circuitry 450 to begin incrementing, and, when a count of "12" is reached, identified by circuit 451, the division process will have been completed and the "TAUWT" signal is sent on output 452. The TAUWT signal causes the state machine to provide the Tau, which will update the PLL if there is no window error. If there is a window error, the process will start over.

The Edge Processing block responds to state "8" by analyzing the interval with respect to the window. Referring to FIGS. 18 and 19 of the Edge Processor, the microprocessor sends the "WINMODE" signal 194 and sets the thresholds identifying the length of the interval in which the burst is to be examined. The high threshold is "HIWIN" 195 and the low threshold is "LOWIN" 196. The interval count and INTOK are sent to inputs 275 and 274, respectively, of FIGS. 18 and 19. When not in window mode, the HIWIN and LOWIN inputs are shifted 8 bits by circuits 460 and 461 to match the number of bits of the INTCNT, and the circuitry essentially operates to insure that the interval counter is always within the window so that no output is provided on output "WINERR" 462.

When in window mode, the shifted thresholds are gated by the INTOK input 274 to register 464 and output 465 and to register 466 and output 467, respectively. The threshold outputs are provided to circuits 470 and 471 for comparison to the interval count at input 275. If there is a window error, and the state machine moves out of state "8", which occurs as the PLL is updated, gate 474 drops, operating gate 475 to provide the error signal to register 476. The error signal is latched and provided on output 462 to the state machine. As shown in FIG. 17, the state machine is reset to look for another interval, if WINERR="1". If WINERR="0", the state machine moves to state "A" and resets the PLL to the estimated Tau.

In state "A", the state machine continues to monitor the individual burst patterns and to increment a counter 480 in FIG. 20. Each bit interval is monitored at LENCNT input 404, and if the interval equals the value set at RUNLEN input 190, the circuit 481 provides an output to increment the counter. The output is gated to the counter by circuit 482 which identifies that the state machine is in state "A". "VFODET" 197 indicates the number of VFO characters comprising a complete pattern of VFO characters including the predetermined element. Once the count has reached the programmed value, typically 10, the measurement is considered good and circuit 485 provides an output to be latched into register 486 and provided on "VFOK" output 487. The state machine reaches state "D", indicating that the PLL is locked and indicates to the microprocessor via the "PDON" output that processing is complete.

The operation of the frequency control logic on DVD-RAM data is shown in FIG. 21. Specifically, the frequency control logic is operating in three regions: two ID fields of differing polarity and a data field. For the first ID field, the processing begins with a transition on Read Gate 1 from low to high. Immediately, the frequency control logic makes a measurement and sets the PLL center frequency with FC reset signal 490. Edge and data processing begin and, after the above requirements have been fulfilled, the PDON signal is activated indicating that the PLL is locked. The processes occur again in the following ID field and the data field. It can be seen in the phase-error waveform that the PLL locks quickly and accurately to the target waveforms.

The frequency control, preferably using the VFO signals as the predetermined element, may also be used for tape drives such as described in FIG. 3. High end tape drives frequently start and stop for a variety of reasons. The frequency control allows the drive to begin reading the data sooner after starting and, thus, improve the overall data rate of the drive.

While the preferred embodiments of the present invention have been illustrated in detail, it should be apparent that modifications and adaptations to those embodiments may occur to one skilled in the art without departing from the scope of the present invention as set forth in the following claims.

We claim:

1. A digital edge processor for estimating the center frequency of a recorded signal having a known format, said processor responsive to a sampling detector which samples said recorded signal at a known rate to provide edge signals indicating detection of recorded signal pulse edges, comprising:
   an edge pattern identifier coupled to said sampling detector for detecting a relationship between said edge signals of said recording signal matching a predetermined element of said known format;
   an interval counter coupled to said pattern identifier for measuring the interval length in units of said sample length between said matching edges; and
   a center frequency estimator coupled to said interval counter for calculating the period of the center frequency of said matching edges by relating said matching edge interval length to a predetermined nominal wave length for said predetermined element of said known format.

2. The digital edge processor of claim 1, wherein said interval counter counts said samples during the interval between said matching edges to provide said matching edge interval length.

3. The digital edge processor of claim 2, wherein said sampling detector edge signals additionally indicate the relative position of said detected edge signals in said samples, and wherein said processor interval counter sums said sample counts and said relative positions of said detected edge signals to determine said matching edge interval length.

4. The digital edge processor of claim 3, wherein said center frequency estimator calculates the period of the center frequency of said matching edges by dividing said predetermined nominal wave length for said predetermined element by said matching edge interval length.

5. The digital edge processor of claim 4, wherein said digital edge processor is responsive only to ones of said edge signals indicating detection of the same polarity edges.

6. The digital edge processor of claim 4, additionally comprising a frame processor coupled to said sampling detector for counting a predetermined number of said edge signals for establishing a processing interval for said digital edge processor.

7. The digital edge processor of claim 6, wherein said known format recorded signal comprises encoded binary data, and said predetermined element comprises the longest span between edges of an encoded data pattern, and wherein said frame processor processing interval is arranged to be sufficiently long to encounter said encoded data pattern in said known format, and wherein said edge pattern identifier identifies said encoded data pattern by identifying the longest span between edges of an encoded data pattern in said samples of said recorded signal in said processing interval.

8. The digital edge processor of claim 4, wherein said predetermined element comprises the character of said known format recorded signal having a predetermined long span between said pulse edges, and wherein said edge pattern identifier identifies said predetermined long span between said detected pulse edges in said samples of said recorded signal.

9. The digital edge processor of claim 4, wherein said predetermined element comprises a burst pattern of edges of said known format recorded signal, and wherein said edge pattern identifier identifies said burst pattern of said detected pulse edges in said samples of said recorded signal.

10. The digital edge processor of claim 4, wherein said predetermined element comprises an edge pattern appearing at a predetermined location in said known format recorded signal, and wherein said edge pattern identifier identifies said predetermined location in said samples of said recorded signal.

11. The digital edge processor of claim 4, additionally comprising a frequency error detector for subsequently checking said measured interval length to determine whether said estimated center frequency is erroneous.

12. A random access constant linear velocity optical disk drive for reading known format recorded signals from an optical disk, comprising:
   an optical read head which may be adjustably positioned radially of a center of rotation for reading said known format recorded signals from said optical disk;
   a motor drive system for mounting said optical disk at said center of rotation, rotating said optical disk, and for adjusting the rotation speed of said optical disk in accordance with said radial position of said optical read head to achieve a constant linear velocity between said optical read head and said optical disk at said radial position;
   a data read channel sampling detector coupled to said optical read head for sampling said recorded signals at a known rate to provide edge signals indicating detection of recorded signal pulse edges for reading said recorded signals, said sampling detector including a digital PLL for locking on said recorded signal pulse edges to operate said sampling detector at said known rate, said digital PLL having a Tau input for changing the period of the center frequency of said PLL; and
   a digital edge processor coupled to said sampling detector for estimating the period of the center frequency of said known format recorded signals, said processor responsive to said sampling detector, upon a radial adjustment of said read head and before said motor adjusts said rotation speed of said optical disk, to provide said estimated period of the center frequency to said PLL to bring said PLL close to said center frequency of said recorded signals, whereby said PLL may lock on said recorded signal pulse edges to operate said read channel, said digital edge processor having:
      an edge pattern identifier coupled to said sampling detector for detecting a relationship between said edge signals of said recording signal matching a predetermined element of said known format;
      an interval counter coupled to said pattern identifier for measuring the interval length in units of said sample length between said matching edges; and
      a center frequency estimator coupled to said interval counter for calculating the period of the center frequency of said matching edges by relating said matching edge interval length to a predetermined nominal wave length for said predetermined element of said known format, said center frequency estimator coupled to said digital PLL Tau input for supplying said calculated period of the center frequency to said digital PLL.

13. The optical disk drive of claim 12, wherein said interval counter counts said samples during the interval between said matching edges to provide said matching edge interval length.

14. The optical disk drive of claim 13, wherein said sampling detector edge signals additionally indicate the relative position of said detected edge signals in said samples, and wherein said processor interval counter sums said sample counts and said relative positions of said detected edge signals to determine said matching edge interval length.

15. The optical disk drive of claim 14, wherein said center frequency estimator calculates the period of the center frequency of said matching edges by dividing said predetermined nominal wave length for said predetermined element by said matching edge interval length.

16. The optical disk drive of claim 15, wherein said digital edge processor is responsive only to ones of said edge signals indicating detection of the same polarity edges.

17. The optical disk drive of claim 15, additionally comprising a frame processor coupled to said sampling detector for counting a predetermined number of said edge signals for establishing a processing interval for said digital edge processor.

18. The optical disk drive of claim 17, wherein said known format recorded signal comprises encoded binary data, and said predetermined element comprises the longest span between edges of an encoded data pattern, and wherein said frame processor processing interval is arranged to be sufficiently long to encounter said encoded data pattern in said known format, and wherein said edge pattern identifier identifies said encoded data pattern by identifying the longest span between edges of an encoded data pattern in said samples of said recorded signal in said processing interval.

19. The optical disk drive of claim 15, wherein said predetermined element comprises the character of said known format recorded signal having a predetermined long span between said pulse edges, and wherein said edge pattern identifier identifies said predetermined long span between said detected pulse edges in said samples of said recorded signal.

20. The optical disk drive of claim 15, wherein said predetermined element comprises a burst pattern of edges of said known format recorded signal, and wherein said edge pattern identifier identifies said burst pattern of said detected pulse edges in said samples of said recorded signal.

21. The optical disk drive of claim 15, wherein said predetermined element comprises an edge pattern appearing at a predetermined location in said known format recorded signal, and wherein said edge pattern identifier identifies said predetermined location in said samples of said recorded signal.

22. The optical disk drive of claim 15, additionally comprising a frequency error detector for subsequently checking said measured interval length to determine whether said digital PLL center frequency is erroneous.

23. A method for estimating the center frequency of a recorded signal having a known format, wherein said recorded signal is sampled at a known rate to provide edge signals indicating detection of recorded signal pulse edges, comprising the digital processing steps of:
   identifying a pattern of matching edges by detecting a relationship between said edge signals of said recording signal which matches a predetermined element of said known format;
   measuring the interval length in units of said sample length between said identified matching edges; and
   calculating the period of the center frequency of said identified matching edges by relating said matching edge interval length to a predetermined nominal wave length for said predetermined element of said known format.

24. The method for estimating the center frequency of claim 23, wherein said step of measuring the interval length comprises counting said samples during the interval between said matching edges to provide said matching edge interval length.

25. The method for estimating the center frequency of claim 24, wherein said sampled edge signals additionally indicate the relative position of said detected edge signals in said samples, and wherein said step of measuring the interval length comprises summing said sample counts and said relative positions of said detected edge signals to determine said matching edge interval length.

26. The method for estimating the center frequency of claim 25, wherein said step of calculating the period of the center frequency of said matching edges comprises dividing said predetermined nominal wave length for said predetermined element by said matching edge interval length.

27. The method for estimating the center frequency of claim 26, wherein said step of identifying a pattern of matching edges comprises detecting a relationship between ones of said edge signals representing only edges of the same polarity.

28. The method for estimating the center frequency of claim 26, additionally comprising the step of establishing a frame processing interval for conducting said steps, by counting a predetermined number of said edge signals.

29. The method for estimating the center frequency of claim 28, wherein said known format recorded signal comprises encoded binary data, and said predetermined element comprises the longest span between edges of an encoded data pattern, and wherein said frame processing interval of said frame establishing step is arranged to be sufficiently long to encounter said encoded data pattern in said known format, and wherein said step of identifying a pattern of matching edges comprises identifying said encoded data pattern by identifying the longest span between edges of an encoded data pattern in said samples of said recorded signal in said processing interval.

30. The method for estimating the center frequency of claim 26, wherein said predetermined element comprises the character of said known format recorded signal having a predetermined span between said pulse edges, and wherein said step of identifying a pattern of matching edges comprises identifying said predetermined long span between said detected pulse edges in said samples of said recorded signal.

31. The method for estimating the center frequency of claim 26, wherein said predetermined element comprises a burst pattern of edges of said known format recorded signal, and wherein said step of identifying a pattern of matching edges comprises identifying said burst pattern of said detected pulse edges in said samples of said recorded signal in said processing interval.

32. The method for estimating the center frequency of claim 26, wherein said predetermined element comprises an edge pattern appearing at a predetermined location in said known format recorded signal, and wherein said step of identifying a pattern of matching edges comprises identifying said predetermined location in said samples of said recorded signal.

33. The method for estimating the center frequency of claim 26, comprising the additional step of subsequently checking said measured interval length to determine whether said estimated center frequency is erroneous.

\* \* \* \* \*